United States Patent [19]

Singh et al.

[11] 4,307,818
[45] Dec. 29, 1981

[54] CLOSURE FOR A PRESSURIZED CHAMBER

[75] Inventors: Harinder Singh; Richard L. Ostromecki, both of Erie, Pa.

[73] Assignee: American Sterilizer Company, Erie, Pa.

[21] Appl. No.: 235,509

[22] Filed: Feb. 18, 1981

[51] Int. Cl.³ .............................................. B65D 45/00
[52] U.S. Cl. ...................................... 220/316; 220/323
[58] Field of Search ............... 220/316, 323, 203, 293, 220/303

[56] References Cited

U.S. PATENT DOCUMENTS

| | | | |
|---|---|---|---|
| 1,858,013 | 5/1932 | Heins | 220/316 |
| 3,173,572 | 3/1965 | Beecher | 220/323 |
| 3,694,145 | 9/1972 | Stevens | 220/323 X |
| 4,093,104 | 6/1978 | Hutchinson | 220/316 |
| 4,251,007 | 2/1981 | Behnisch | 220/316 |

Primary Examiner—George T. Hall
Attorney, Agent, or Firm—Robert D. Yeager; Andrew J. Cornelius

[57] ABSTRACT

A closure for a chamber having an interior which can contain a fluid under pressure provides apparatus for latching the door of the chamber in its closed position and locking it in that position when the positive pressure within the chamber reaches a predetermined level. The closure includes a door that is moved by positive pressure within the chamber and, through appropriate mechanisms, activates locking apparatus that prevents the door from leaving its closed position as long as such pressure is present within the chamber.

14 Claims, 12 Drawing Figures

CLOSURE FOR A PRESSURIZED CHAMBER

BACKGROUND OF THE INVENTION

1. Field of the Invention

The present invention relates to closures for chambers and, more particularly, to a closure for a chamber having an interior that can be placed under pressure, such as a sterilizer.

2. Description of the Prior Art

There exists a wide variety of chambers adapted for maintaining a positive pressure. An example of such a chamber is a sterilizer that operates under positive pressure during at least a portion of the sterilizing cycle. One disadvantage associated with the use of all such chambers, however, is the risk that a person will open the door of the chamber while its interior is under positive pressure; accordingly, workers in the art have devised closures that minimize such a risk.

One type of such a closure employs a door having a deformable member—such as a diaphragm or a lid—that is secured to an inner surface of the door. A portion of the deformable member is deformed by positive pressure present within the chamber and urged toward the exterior of the chamber. The movement of the deformed portion activates a locking mechanism which prevents a person from opening the door until the pressure falls below a predetermined minimum and permits the deformable member to assume its original undeformed shape. Although closures employing such a deformable member have enjoyed some success in solving the problem identified above, it is not possible to produce such members of consistent dimensions; for example, it is not possible to produce dished diaphragms of consistent depth. Accordingly, the effect of the same amount of pressure on the deformable members of a number of closures of the same design may vary greatly from one member to another causing nonuniform activation of the corresponding locking mechanism. The deformable members of closures of the same type will actually lock and unlock the door of a chamber at different pressures.

Further, known closures can operate effectively only by exerting a mechanically-compressive force on the seal between the door of the chamber and the chamber to prevent fluid leakage from the interior of the chamber. Such a restriction makes the closure relatively complicated, costly and difficult to use. Moreover, such a restriction highly stresses the seal during use of the chamber and, therefore, the seal must be replaced periodically.

A closure for a pressurized receptacle is disclosed in U.S. Pat. No. 4,159,063, issued to Weber et al. However, the closure disclosed in U.S. Pat. No. 4,159,063 employs a deformable member—an internal lid—to activate the locking mechanism and requires that compressive force be exerted on the sealing device to prevent fluid leakage from the interior of the chamber.

Accordingly, there exists a need for a closure for a chamber having an interior that may be placed under positive pressure that does not require that the sealing device of the chamber be placed under compressive force to prevent fluid leakage from the chamber and which does not use a deformable member to activate the locking mechanism of the closure.

SUMMARY OF THE INVENTION

The present invention provides a closure having apparatus for securing in the closed position of the door of a chamber and a sealing device for effecting a seal between the door and the chamber. The door of the present invention is adapted to move between a closed position, in which the door is in contact with the sealing device, and an open position, in which the door is not in contact with the sealing device.

The sealing device of the present invention is disposed between the door and the perimeter of the opening and is capable of effecting a seal therebetween when the door is in the closed position without the presence of a mechanically-compressive force on the sealing device.

The closure includes apparatus disposed on the chamber and the door for cooperating to prevent the door from leaving its closed position after it has been moved thereto.

The closure further includes apparatus operatively connected between the door and the cooperating apparatus for rendering inoperative the cooperating apparatus during any period that a positive pressure of a predetermined minimum value exists within the chamber.

Accordingly, the present invention provides a closure that need not exert a mechanically-compressive force on a sealing device to effect a seal between the door and the chamber. Therefore, the present invention is mechanically simpler and less costly to manufacture than conventional closures that must compress a sealing device to operate properly and decreases the human effort and time required to close the door.

DETAILED DESCRIPTION OF THE PREFERRED EMBODIMENTS

The preferred embodiment of the present invention described below is adapted to latch and lock in the closed position the door of a sterilizer. Latching apparatus of the preferred embodiment, when activated, prevents the door from leaving its closed position until the latching apparatus is deactivated by the user. Locking apparatus of the preferred embodiment prevents the user from deactivating the latching apparatus and moving the door from its closed and latched position during at least a portion of the sterilizing cycle when positive pressure is present within the sterilizer.

Figure 1:
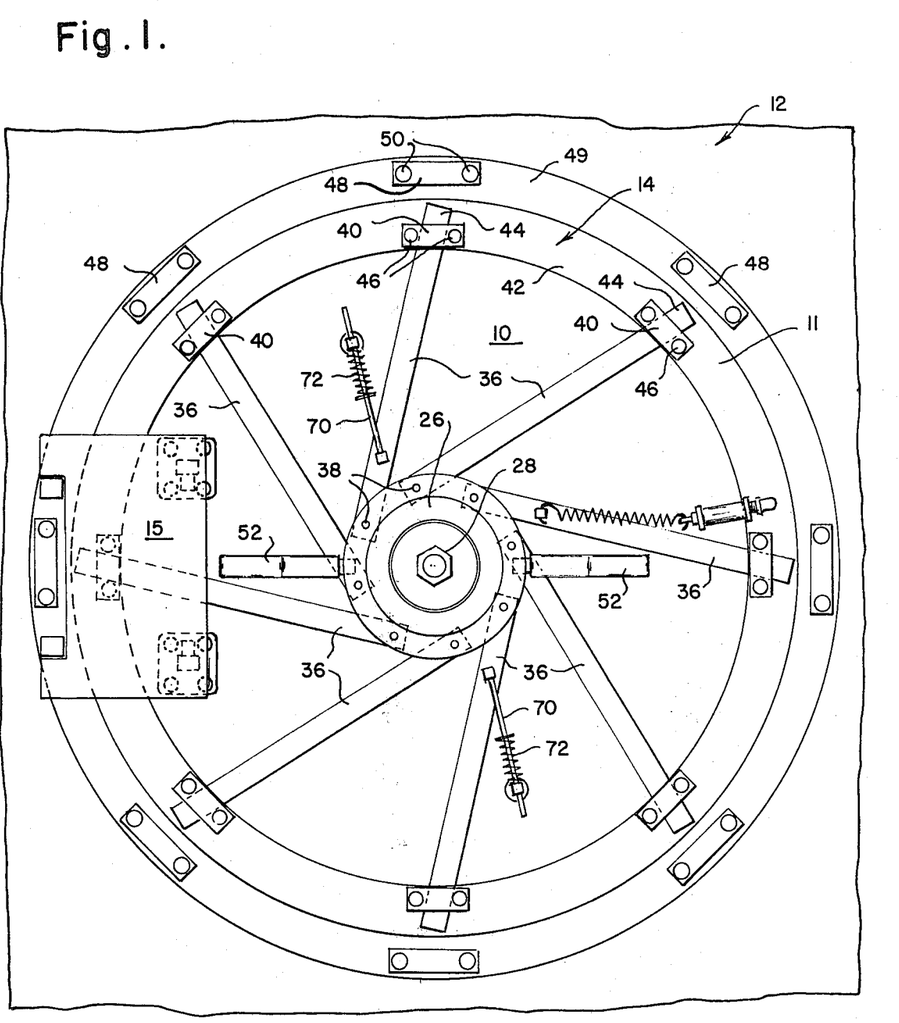
FIG. 1 is a front elevational view of a portion of a sterilizer and closure therefor constructed in accordance with the teachings of the present invention, with the closure in the closed but unlatched position.
Figure 2:
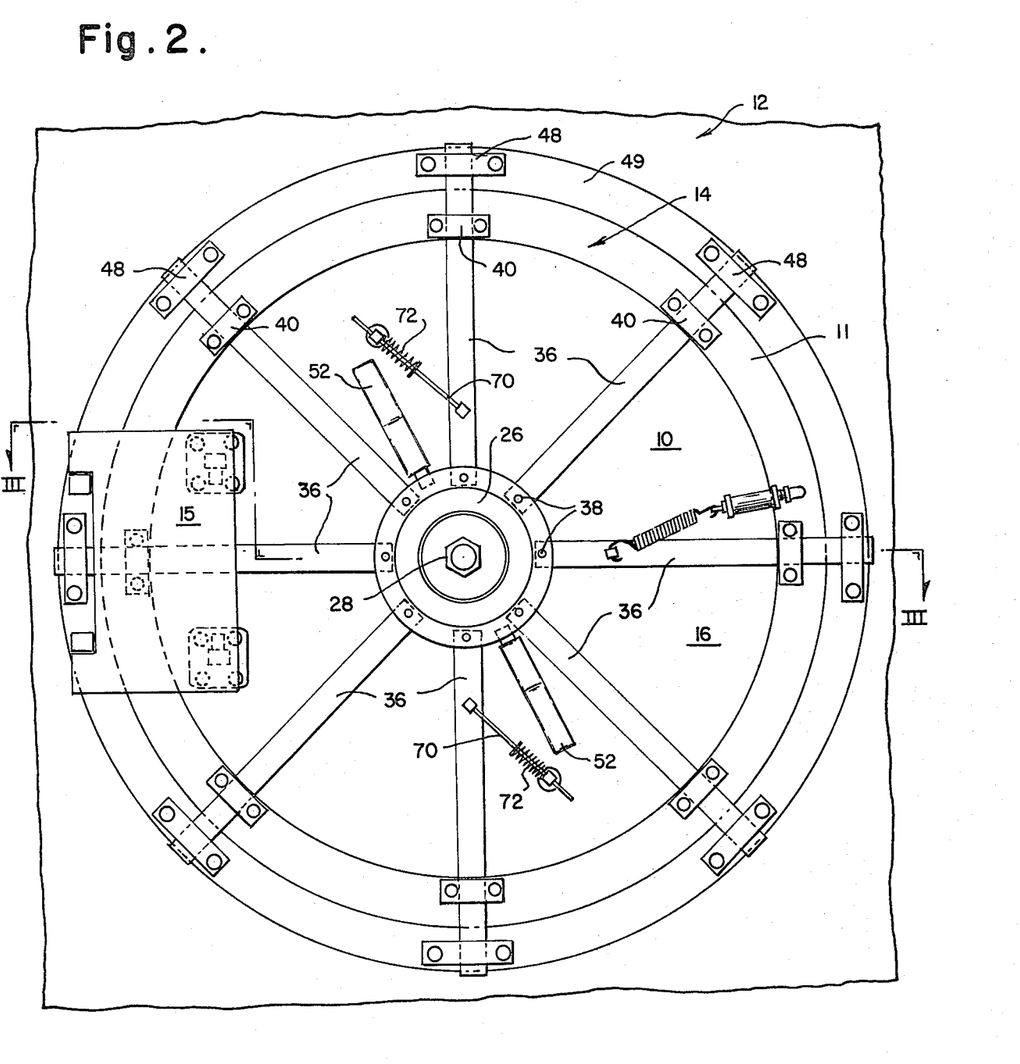
FIG. 2 is a view of the closure shown in FIG. 1 in the closed and latched position.

Closure 10 is shown in FIGS. 1 and 2 installed on a typical sterilizer 12. Preferably, a suitable cover 13 (shown only as a chain line in FIG. 3) would be suitably secured to rim 11 during use of sterilizer 12 to hide closure 10 from view but has been generally omitted from the drawings herein to facilitate description of closure 10.

Figure 3:
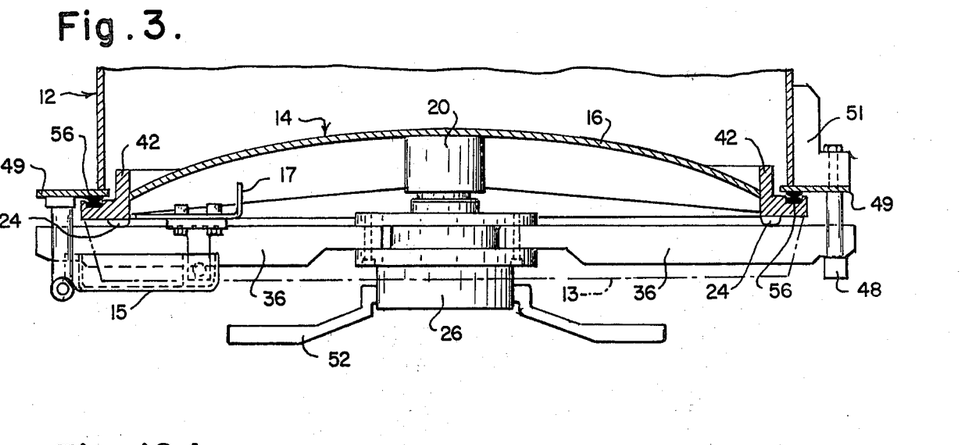
FIG. 3 is a sectional view of the closure shown in FIG. 2 taken along the lines III—III.
Figure 4:
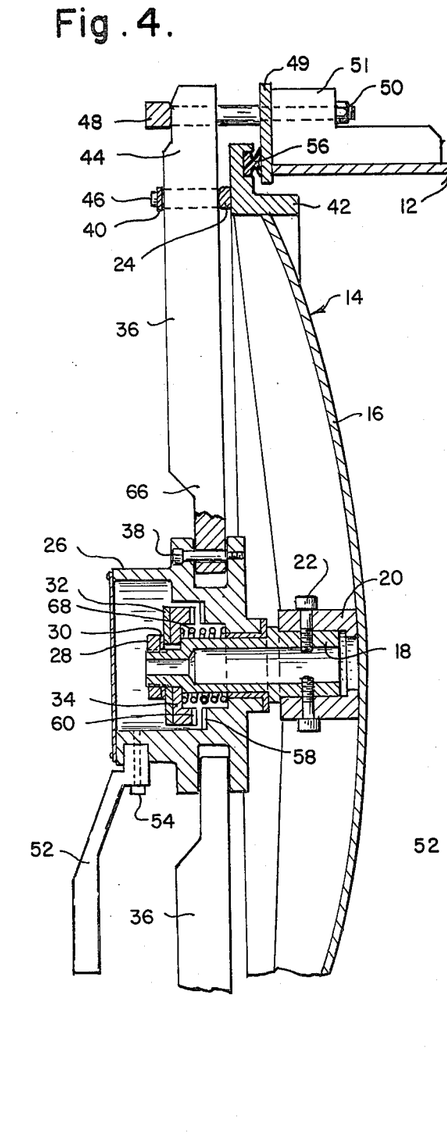
FIG. 4 is a side view, partly in section, of a portion of the closure shown in FIG. 2, with the closure in the latched, but unlocked position.
Figure 5:
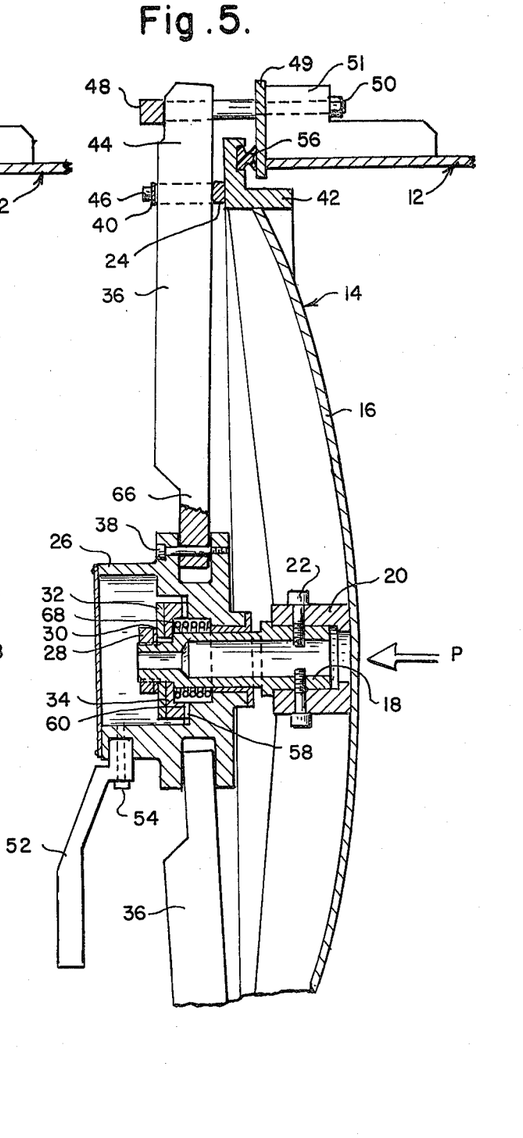
FIG. 5 is a view of the closure shown in FIG. 4, but with the locking mechanism in the locked position.
Figure 6:
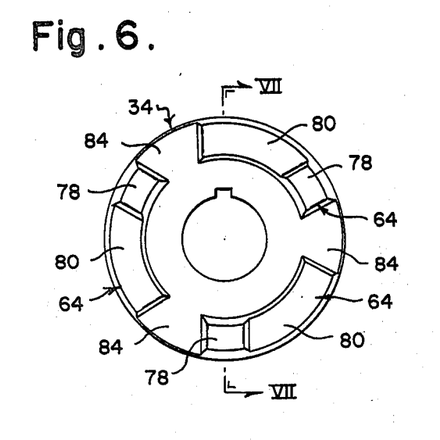
FIG. 6 is a top plan view of the locking plate of the preferred embodiment shown in FIG. 1.
Figure 7:
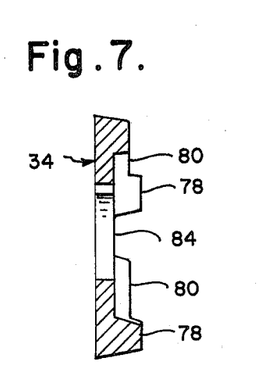
FIG. 7 is a sectional view of the locking plate shown in FIG. 6 taken along the lines VII—VII.
Figure 8:
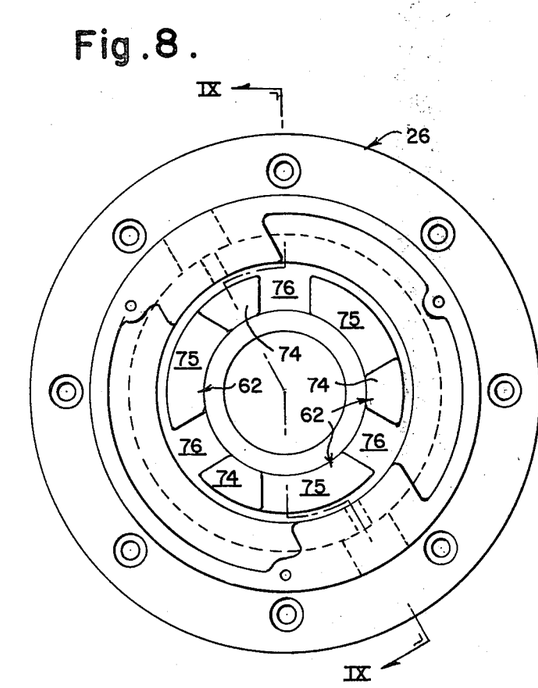
FIG. 8 is a plan view of the door hub of the preferred embodiment shown in FIG. 1.
Figure 9:
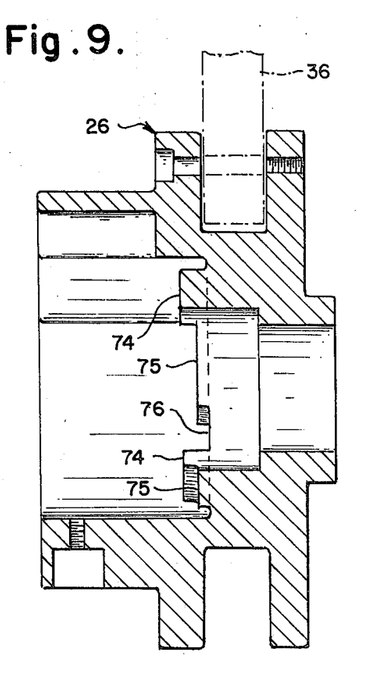
FIG. 9 is a sectional view of the door hub shown in FIG. 8 taken along the lines IX—IX.

As is shown in FIGS. 1 through 5, closure 10 includes a door 14 mounted with a hinge 15 on sterilizer 12 for movement between its open position (not shown) and its closed position shown in the drawings herein. Hinge 15 is suitably secured to support plate 17 and flange 49 as shown in FIGS. 3, 4 and 5. Door 14, which includes a dish 16 secured thereto, is mounted on hinge 15 for limited movement toward its open position when a positive pressure within the chamber of sterilizer 12 exerts a force on dish 16. A post 18 is secured to a bracket 20 with screws 22. Bracket 20 is suitably secured to dish 16. Accordingly, post 18 moves with dish 16. A hub 26 is mounted on post 18 and is capable of rotational and axial movement relative to post 18. Hub 26 is retained on post 18 by locknut 28, lockwasher 30, backup plate 32 and locking plate 34.

Arms 36 are secured at one end to hub 26 by screws 38 (only one shown). Arms 36 pass beneath catches 40 which are secured to door flange 42 with screws 46. Catches 40 prevent ends 44 from moving away from door flange 42 but permit arms 36 to slide therebeneath and tilt on fulcrum 24. Retainers 48 are mounted to flange 49 and gussets 51 of the sterilizer shell of sterilizer 12 with bolts 50 to retain ends 44 of arms 36 thus retaining closure 10 to sterilizer 12. Catches 40 permit limited movement of door 14 toward its open position while retainers 48 prevent door 14 from leaving its closed position. Handles 52 are secured to hub 26 by screws 54.

Accordingly, door 14 can be swung to the closed position from the open position by rotating hub 26 in the counterclockwise direction with handles 52 until arms 36 assume the retracted positions generally shown in FIG. 1 and moving door 14 to its closed position, that is, the position in which it is in contact with sealing device 56. Then, door 14 is latched in its closed position by rotating hub 26 in the clockwise direction, thereby causing arms 36 to slide beneath catches 40 until ends 44 of arms 46 pass beneath retainers 48 and arms 36 assume radial positions generally shown in FIG. 2. With arms 36 in the positions shown in FIG. 2, it is not possible to move door 14 to its open position unless hub 26 is rotated in the counterclockwise direction and ends 44 become disengaged from retainers 48.

Sealing device 56, disposed between flanges 42 and 49, can be any such device which can effect a seal between two surfaces without those surfaces exerting a mechanically-compressive force on the device. However, the double-lip sealing device described and claimed in U.S. patent application Ser. No. 221,425, filed on Dec. 30, 1980 by James A. Hopper, assigned to the same entity as the present application, (hereinafter referred to as the "Hopper application"), is particularly suitable for use as sealing device 56 in the present invention. The sealing device disclosed in the Hopper application effects a seal between two surfaces during any period that a pressure differential exists thereacross. U.S. patent application Ser. No. 221,425 is hereby incorporated by reference herein. Since the preferred sealing device 56 is described in full in the Hopper application, it will not be described further herein.

Figure 10A:
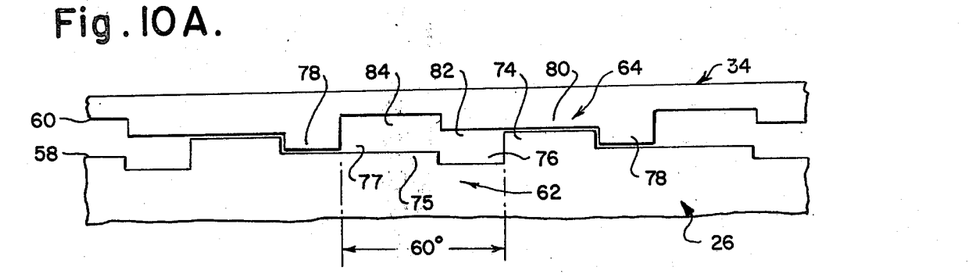
FIGS. 10A, 10B and 10C illustrate the orientation of the hub and locking plate keys of the preferred embodiment when the door is in the unlatched, latched but unlocked, and latched and locked positions, respectively.
Figure 10B:
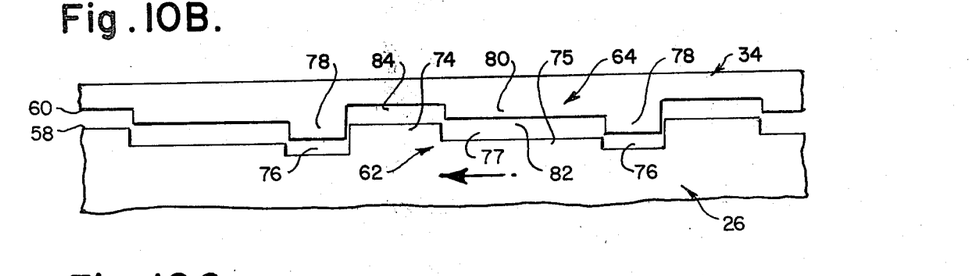
Figure 10C:
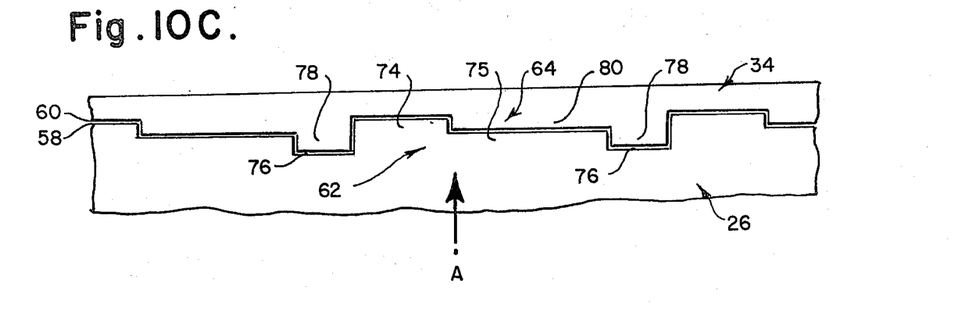

Each surface 58 and 60 of hub 26 and locking plate 34, respectively, incudes three keys which mate with each other in two modes when surfaces 58 and 60 are brought together. FIGS. 6 and 7 and FIGS. 8 and 9 show the hub and locking plate keys 62 and 64. As shown in FIGS. 10A, 10B and 10C, each key 62 includes key protrusions 74 and 75 and key spaces 76 and 77. Each key 64 includes key protrusions 78 and 80 and key spaces 82 and 84. FIGS. 10A, 10B and 10C show how key protrusions 74, 75, 78 and 80 and key spaces 76, 77, 82 and 84 cooperate to effect latching and locking of door 14.

When hub 26 and arms 36 are in the unlatched position shown in FIG. 1, keys 62 and 64 are spatially related as shown in FIG. 10A, and hub 26 can be rotated in the clockwise (right) direction. When hub 26 and arms 36 are in the latched position shown in FIG. 2, keys 62 and 64 are spatially related as shown in FIG. 10B and are mated in a firt mode; hub 26 is prevented from rotating further in the clockwise direction by protrusions 74 and 78, and door 14 cannot be moved from the closed position unless hub 26 is rotated in the counterclockwise (left) direction and ends 44 of arms 36 are freed from retainers 48. When keys 62 and 64 are in the locked position shown in FIG. 10B, and surfaces 58 and 60 are forced together by the positive pressure within the chamber, keys 62 and 64 assume the positions shown in FIG. 10C and are mated in a second mode; hub 26 cannot be rotated to the unlatched position in which ends 44 of arms 36 are freed from retainers 48 until surfaces 58 and 60 are separated by the appropriate distance and keys 62 and 64 again assume the unlocked position shown in FIG. 10B; thus, while in the positions shown in FIG. 10C, keys 62 and 64 prevent operation of closure 10 to move door 14 from the closed position.

When door 14 is latched in the closed position and the interior of sterilizer 12 is not under a positive pressure, surfaces 58 and 60 are separated as shown in FIGS. 4, 10A and 10B. However, a positive pressure within sterilizer 12 will exert a force P on dish 16, deflect door 14 toward its open position, and move hub keys 62 in the direction indicated by arrow A in FIG. 10C toward locking plate keys 64 until, at a predetermined positive pressure, keys 62 and 64 assume the locked position shown in FIG. 10C.

Door 14 and post 18 are moved in the direction of the arrow P by positive pressure within sterilizer 12. As post 18 begins to move in the direction shown by the arrow P, flange 42 exerts a force on end 44 of end 36 through catch 40 and fulcrum 24. Arm 36 pivots about retainer 48 and end 66 of arm 36 moves hub 26 toward locking plate 34 until surfaces 58 and 60 come into contact with each other, locking hub 26 in place. Hub 26 remains locked in place until the pressure within sterilizer 12 falls to a level sufficient to permit spring 68 to separate surfaces 58 and 60 by a distance sufficient to allow protrusion 75 to rotate past protrusion 78 thus permitting rotation of hub 26 to the unlatched position shown in FIG. 10A.

Spring 68 is mounted on post 18 between hub 26 and locking plate 34 to bias keys 62 and 64 away from each other as shown in FIGS. 10A and 10B. When the chamber of sterilizer 12 is under sufficient positive pressure, for example 0.5 p.s.i., spring 68 is defeated and hub 26 begins to move toward locking plate 34. Positioning devices 70, shown in FIGS. 1 and 2 include compression springs 72 that bias arms 36 toward the positions shown in FIGS. 1 and 2 and render arms 36 stable only in those positions.

To operate closure 10 when door 14 is in its open position, hub 26 is rotated in the counterclockwise direction until arms 36 assume the positions shown in FIG. 1 and keys 62 and 64 assume the positions shown in FIG. 10A. Door 14 is closed and hub 26 is rotated in the clockwise direction until arms 36 assume their radial position shown in FIG. 2 and keys 62 and 64 assume the positions shown in FIG. 10B; at this point, closure 10 assumes the latched position shown in FIG. 4. Finally, fluid is introduced into sterilizer 12 and, when the pressure therein reaches a predetermined level, keys 62 and 64 assume the positions shown in FIG. 10C and closure 10 assumes the locked and latched position shown in FIG. 5.

To open closure 10 when keys 62 and 64 are in the positions shown in FIG. 10C, it is necessary to release fluid from sterilizer 12 until keys 62 and 64 assume the positions shown in FIG. 10B due to the force exerted on hub 26 and locking plate 34 by spring 68, and closure 10 assumes the latched but unlocked position shown in FIG. 4. Then hub 26 is rotated in the counterclockwise direction until arms 36 assume their nonradial positions shown in FIG. 1 and keys 62 and 64 assume the positions shown in FIG. 10A; at this point, door 14 is in its unlatched position. Finally, door 14 is swung to its open position.

What is claimed is:

1. A sealable closure for an opening in a chamber comprising:
   a door adapted to move between a closed position and an open position with respect to said opening in said chamber;
   a sealing device disposed between said door and the perimeter of said opening, said sealing device being operable to effect a seal therebetween when said door is in its closed position without the need for applying a mechanically-compressive force to said seal;
   means disposed on said chamber and said door for cooperating to prevent said door from leaving its closed position after having been moved thereto; and
   means operatively connected between said door and said cooperating means for rendering inoperative said cooperating means during any period that a positive pressure of a predetermined minimum value exists within said chamber.

2. The closure recited in claim 1 wherein said cooperating means allows limited movement of said door toward and away from its open position while said door is in its closed position.

3. The closure recited in claim 2 wherein said rendering inoperative means is activated by movement of said door toward its open position through a predetermined distance while said door is in its closed position.

4. The closure recited in claim 3 wherein said rendering inoperative means further comprises:
   a locking plate secured to said door having a surface with a first key disposed thereon; and
   a second key mounted to said door for rotational movement relative to said first key, said second key capable of cooperating with said first key upon occurrence of said activating movement of said door to render inoperative said cooperating means.

5. The closure recited in claim 4 wherein said cooperating means comprises:
   a post mounted on said door for movement therewith, said locking plate being secured to said post;
   a hub mounted on said post for movement therewith and for rotational movement relative to said post;
   securing means mechanically cooperating with said hub for releasably retaining said door in said closed position when said hub is rotated through a predetermined arc; and
   means for rotating said hub.

6. The closure recited in claim 5 wherein said second key is secured to said hub, and said hub is mounted on said post for axial and rotational movement relative thereto.

7. The closure recited in claim 6 wherein said cooperating means further comprises a lever pivotally secured at a first end to said hub and means secured to said door for engaging said lever and permitting limited movement of said lever away from said door, the second end of said lever being pivotally secured to said chamber when said door is in its closed position, said first end of said lever moving said hub toward said locking plate upon said activating movement of said door until said first and second sets of keys assume their mated position and lock said door in its closed position.

8. The closure recited in claim 6 wherein said first and second keys are arranged to permit rotation of said hub through a predetermined arc of not more than 360 degrees, when said door is in its closed position, from a position in which said cooperating means is inoperative to a position in which said cooperating means is operative, said first key being in a position to enter said mated position of said first and second keys, when said door is in its closed position and said cooperating means is operative, upon movement of said door through said predetermined distance.

9. The closure recited in claim 8 wherein said first and second keys prevent said hub from rotating through more than 60 degrees.

10. The closure recited in claim 8 wherein said cooperating means includes said lever, said second end of said lever being pivotally secured to said chamber by a retainer secured to said chamber, said retainer engaging said second end of said lever when said door is placed in its closed position and said hub is rotated through said predetermined arc.

11. The closure recited in claim 10 wherein said rendering inoperative means further comprises means for biasing said keys toward positions in which said keys are not in said mated position.

12. A selable closure for an opening in a chamber comprising:
   a door adapted to move between a closed position and an open position with respect to said opening in said chamber and adapted for limited movement while said door is in its closed position, said limited movement being caused by a change of pressure within the chamber;
   a sealing device disposed between said door and the perimeter of said opening, said sealing device being operable to effect a seal therebetween when said door is in its closed position without the need for applying a mechanically-compressive force to said sealing device;

a post secured to said door for movement therewith;

a hub mounted on said post for rotational and axial movement relative to said post, said hub having a key formed on a surface thereof;

a lever and a catch, said lever pivotally secured at one end thereof to said hub and slidably secured at a point intermediate its ends to said door by said catch;

a locking plate secured to said post having a key adapted to mate with said hub key to limit rotation of said hub to a predetermined arc of not more than 360 degrees and to prevent rotation of said hub when the pressure present within the chamber causes said limited movement of said door toward its open position;

a retainer secured to said sterilizer;

a second end of said lever being retained against said sterilizer by said retainer upon rotation of said hub through said predetermined arc when said door is in its closed position, said retainer allowing said limited movement of said door toward its open position when positive pressure is present within said chamber but preventing said door from leaving its closed position; and means for rotating said hub;

said limited movement of said door toward its open position causing said keys to mate and prevent rotation of said hub when said door is secured in said closed position by said retainer.

13. The closure recited in claim 12 wherein said predetermined arc is 60 degrees.

14. The closure recited in claim 12 further comprising means for biasing said hub and locking plate keys in a direction away from each other.

* * * * *

UNITED STATES PATENT AND TRADEMARK OFFICE
CERTIFICATE OF CORRECTION

PATENT NO. : 4,307,818
DATED : December 29, 1981
INVENTOR(S) : Harinder Singh; Richard L. Ostromecki It is certified that error appears in the above—identified patent and that said Letters Patent is hereby corrected as shown below:

Col. 3, line 26, delete ":" and substitute therefor --.--;

Col. 3, line 53, delete "46" and substitute therefor --36--;

Col. 4, line 26, delete "firt" and substitute therefor --first--; and

Col. 6, line 57, delete "selable" and substitute therefor --sealable--.

Signed and Sealed this

Twentieth Day of April 1982

|SEAL|

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,307,818
DATED : December 29, 1981
INVENTOR(S) : Harinder Singh; Richard L. Ostromecki It is certified that error appears in the above—identified patent and that said Letters Patent is hereby corrected as shown below:

Col. 1, line 3, insert the following new paragraph:

--The Govenment has rights in this invention pursuant to Contract No. DAMD 17-79-C-9034 awarded by the United States Army.--

Signed and Sealed this

Eighth Day of November 1983

[SEAL]

Attest:

GERALD J. MOSSINGHOFF

Attesting Officer     Commissioner of Patents and Trademarks